(12) United States Patent
Arauz-Rosado

(10) Patent No.: US 11,063,993 B2
(45) Date of Patent: Jul. 13, 2021

(54) NETWORK FUNCTION VIRTUALIZATION

(71) Applicant: Telefonaktiebolaget LM Ericsson (publ), Stockholm (SE)

(72) Inventor: Jesus-Javier Arauz-Rosado, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 168 days.

(21) Appl. No.: 16/313,324

(22) PCT Filed: Jun. 29, 2016

(86) PCT No.: PCT/EP2016/065179
§ 371 (c)(1),
(2) Date: Dec. 26, 2018

(87) PCT Pub. No.: WO2018/001475
PCT Pub. Date: Jan. 4, 2018

(65) Prior Publication Data
US 2019/0199760 A1    Jun. 27, 2019

(51) Int. Cl.
*G06F 15/177* (2006.01)
*H04L 29/06* (2006.01)
(Continued)

(52) U.S. Cl.
CPC ...... *H04L 65/1073* (2013.01); *G06F 9/45558* (2013.01); *H04L 41/0813* (2013.01);
(Continued)

(58) Field of Classification Search
CPC ............. H04L 41/0813; H04L 61/2007; H04L 61/2061; H04L 61/2525; H04L 65/1073; G06F 2009/45595; G06F 9/45558
See application file for complete search history.

(56) References Cited

U.S. PATENT DOCUMENTS

2016/0057102 A1* 2/2016 Wei ................. H04L 61/2007
                                                   709/226
2016/0364226 A1* 12/2016 Takano ............... G06F 9/5077

OTHER PUBLICATIONS

International Search Report and Written Opinion of the International Searching Authority for International Application No. PCT/EP2016/065179 dated Apr. 6, 2017.
(Continued)

*Primary Examiner* — Ryan J Jakovac
(74) *Attorney, Agent, or Firm* — Sage Patent Group

(57) ABSTRACT

Methods and apparatus for addressing of Virtual Network Functions, VNFs. A registration controller of a VNF instance controls a transmitter to transmit a registration request to a VNF Service Registry, VNF-SR, the registration request identifying a public address of the VNF instance. A receiver of the VNF-SR receives the registration request and a VNF address determiner determines a VNF address for the VNF instance based on the received registration request. A Database Management System, DBMS, stores the determined VNF address in a memory. An event subscriber of a Virtual Network Function Manager, VNFM, controls a transmitter to transmit a subscription request to the VNF-SR, the subscription request comprising an identifier for a VNF. A receiver of a Virtual Configuration Server, VCS, receives a notification from the VNF-SR when a change has occurred in configuration and/or address data stored in the memory of the VNF-SR and relating to one or more VNF instances. A configuration manager determines a configuration instruction for the one or more VNFs based on the received notification, and controls a transmitter to transmit the configuration instruction to the one or more VNF instances.

14 Claims, 4 Drawing Sheets

(51) Int. Cl.
*H04L 29/12* (2006.01)
*H04L 12/24* (2006.01)
*G06F 9/455* (2018.01)

(52) U.S. Cl.
CPC ...... *H04L 61/2007* (2013.01); *H04L 61/2061* (2013.01); *H04L 61/2525* (2013.01); *G06F 2009/45595* (2013.01)

(56) References Cited

OTHER PUBLICATIONS

ETSI, "Network Functions Virtualization (NFV); Management and Orchestration," ETSI GS NFV-MAN 001, V1.1.1, Dec. 2014, 184 pages.
3GPP TR 32.482 V1.0.0, "3$^{rd}$ Generation Partnership Project; Technical Specification Group Services and System Aspects; Telecommunication management; Study on network management of virtualized networks (Release 13)," Mar. 2015, 48 pages.
ETSI, "Network Functions Virtualization (NFV); Virtual Network Functions Architecture," ETSI GS NFV-SWA 001, V1.1.1, Dec. 2014, 93 pages.

\* cited by examiner

NETWORK FUNCTION VIRTUALIZATION

CROSS REFERENCE TO RELATED APPLICATIONS

This application is a 35 U.S.C. § 371 national stage application of PCT International Application No. PCT/EP2016/065179, filed on Jun. 29, 2016, the disclosure and content of which is incorporated by reference herein in its entirety.

TECHNICAL FIELD

The invention relates to Network Function Virtualization (NFV). More specifically, the invention relates to methods and apparatus for the management and configuration of addresses in a telecommunications system comprising Virtual Network Functions (VNFs).

BACKGROUND

Network Function Virtualization (NFV) is beginning to receive greater attention in the telecommunications industry and aims to provide the same service as today's telecommunications networks using proprietary, dedicated hardware (HW) equipment, but using hypervisors on standard commodity HW.

NFV is being standardized mainly in the European Telecommunications Standards Institute (ETSI) by its NFV committees. One of those committees, named NFV-MAN (Management and Orchestration), takes care of the provisioning and configuration aspects of an NFV solution within a telecommunications network.

In standardizing NFV, ETSI has initially adopted standard IT approaches and technologies, supplementing those with telecommunications-specific requirements where the former fall short of satisfying the stringent needs of a telecommunications network.

One problem in the implementation of VNFs in a telecommunications network is that most VNFs within a NFV network interwork with one or more other VNFs in order to provide a certain communication service, or communication functionality, which is referred herein as "Network Function" (NF). For example, a NF can comprise one or more servers (nodes) for providing a terminal (referred herein also as, User Equipment, UE) with a service, such as an "Internet Protocol—IP—Multimedia System" (IMS) service, wherein the IMS service allows the UE to establish—through the mediation of servers of a IMS communication system—a multimedia communication with a counter party, such as another UE, an application server (AS), etc.

For example, within an IMS NF, a VNF implementing a "Call Session Control Function" (CSCF) server may need to interwork with, e.g., one or more VNFs implementing the functionality of one or more servers of an IMS communications system, such as: a Home Subscriber Server, (HSS) and with one or more VNFs implementing a Media Resource Function (MRF) server. Each of those VNFs should be provided with the public addresses of each other VNF (for example, with their Internet Protocol—IP—addresses). Due to all those interworkings, public address allocation in a NFV network (e.g. IP address allocation) becomes a management burden even greater than in a legacy telecommunications networks since changes in a NFV network happen much more often in the former than the latter.

An example of such a burden can be seen in the example MRF instantiation procedure described in section A.1.2 in ETSI GS NFV-MAN 001 V1.1.1. According to that procedure, the NFV operator is responsible for manually providing the public IP addressing configuration to the VNFs building up the MRF.

The interworking between VNFs creates an additional problem. Configuration changes to one VNF in many cases imply a corresponding change in an interworking VNF. For instance, scaling out a VNF providing service to other VNFs implies that those other VNFs must be aware of the new instances in order to start pushing traffic to them. Given the NFV-MAN model, there is no mechanism able to automatically trigger those collateral configuration changes, so the NFV operator is ultimately responsible for manually performing all the changes in every VNF so the overall NF works properly.

An example of this responsibility can be found in the example MRF instantiation procedure described in section A.1.2 in ETSI GS NFV-MAN 001 V1.1.1, specifically in step 17 where the MRF is configured with the IP addresses of the S-CSCFs and ASs it has to interwork with. Adding a new AS VNF requires manually updating the MRF Instance Definition file and re-starting all the MRF VMs.

In summary, one problem is that, in some implementations, some VNFs within a NFV network have to interwork with one or more other VNFs in order to provide a certain service, or a certain NF (e.g. a network functionality, such as a IMS functionality). In known systems, this requires manual provision of the configured IP addresses of instantiated VNFs so as to make them known to all the eventual interworking VNFs. In short, IP address allocation in a NFV network becomes a management burden, which is even greater than in a legacy telecommunications system (i.e. which does not comprises a NFV arrangement and, thus, which does not implement VNFs).

SUMMARY

Exemplary methods and apparatus disclosed herein aim to mitigate or solve one or more problems with the prior art, such as those discussed herein.

According to an aspect of the invention, there is provided a Virtual Network Function Service Registry, VNF-SR, for allocating and storing Virtual Network Function, VNF, addresses and/or configurations for a plurality of VNF instances in a telecommunications system. The VNF-SR comprises a receiver configured to receive a registration request from a computing device for hosting one or more of the plurality of VNF instances, the registration request comprising data identifying a public address of a VNF instance. The VNF-SR comprises a VNF address determiner configured to determine a VNF address for the VNF instance based on the received registration request. The VNF-SR comprises a Database Management System, DBMS, configured to store the determined VNF address in a memory.

The VNF address may be a public address or, more specifically, a public VNF address.

Optionally, the VNF-SR further comprises a VNF classification determiner configured to determine a classification of the VNF instance based on the received registration request, wherein the VNF address determiner is configured to determine the VNF address based on the determined classification.

Optionally, the VNF classification determiner is configured to determine the classification of the VNF instance based on the identified public address.

Optionally, the registration request further comprises data identifying a classification of the VNF instance, and wherein the VNF classification determiner is configured to determine that the classification of the VNF instance is the identified classification.

Optionally, the classification determiner is configured to classify the VNF instance as one of: a pooled VNF, wherein the VNF address is one of a plurality of VNF addresses in an elastic pool of VNF addresses; a singular VNF, wherein the VNF address is a single uniquely identifiable VNF address; and a singular pooled VNF, wherein the VNF address is one of a plurality of VNF addresses in a static pool of VNF addresses.

Optionally, the receiver is further configured to receive a subscription request from a VNF Manager, VNFM, the subscription request comprising an identifier for a VNF, wherein a transmitter is configured to transmit a notification to the VNFM when an event occurs in relation to the identified VNF.

Optionally, the receiver is further configured to receive from a first VNF instance a request for a VNF address of a second VNF instance, wherein the VNF-SR further comprises a VNF address retriever configured to retrieve from the memory the VNF address of the second VNF instance and to control a transmitter to transmit the retrieved VNF address to the first VNF instance.

Optionally, the DBMS is further configured to control a transmitter to transmit a notification to a Virtual Configuration Server, VCS, when a change has occurred to configuration and/or address data relating to a VNF instance and stored in the memory.

Optionally, the change to the configuration and/or address data has been made by one of the VFN-SR and the VCS.

Optionally, the receiver is configured to receive from the VCS an update comprising updated configuration and/or address data relating to one or more VNF instances, and wherein the DBMS is configured to store the updated configuration and/or address data in the memory.

According to a further aspect, there is provided a method for controlling a Virtual Network Function Service Registry, VNF-SR, for allocating and storing Virtual Network Function, VNF, addresses for a plurality of VNF instances in a telecommunications system. The method comprises receiving, by a receiver, a registration request from a computing device for hosting one or more of the plurality of VNF instances, the registration request comprising data identifying a public address of a VNF instance. The method comprises determining, by a VNF address determiner, a VNF address for the VNF instance based on the received registration request. The method comprises storing, by a Database Management System, DBMS, the determined VNF address in a memory.

Optionally, the method further comprises determining, by a VNF classification determiner, a classification of the VNF instance based on the received registration request, wherein the VNF address determiner is configured to determine the VNF address based on the determined classification.

Optionally, the VNF classification determiner determines the classification of the VNF instance based on the identified public address.

Optionally, the registration request further comprises data identifying a classification of the VNF instance, and wherein the VNF classification determiner determines that the classification of the VNF instance is the identified classification.

Optionally, the classification determiner classifies the VNF instance as one of: a pooled VNF, wherein the VNF address is one of a plurality of VNF addresses in an elastic pool of VNF addresses; a singular VNF, wherein the VNF address is a single uniquely identifiable VNF address; and a singular pooled VNF, wherein the VNF address is one of a plurality of VNF addresses in a static pool of VNF addresses.

Optionally, the method further comprises receiving, by the receiver, a subscription request from a VNF Manager, VNFM, the subscription request comprising an identifier for a VNF; and transmitting, by a transmitter, a notification to the VNFM when an event occurs in relation to the identified VNF instance.

Optionally, the method further comprises receiving, by the receiver, of a first VNF instance a request for a VNF address of a second VNF instance; retrieving, by a VNF address retriever, the VNF address of the second VNF instance from the memory; and transmitting, by a transmitter, the retrieved VNF address to the first VNF instance.

Optionally, the method further comprises the DBMS controlling a transmitter to transmit a notification to a Virtual Configuration Server, VCS, when a change has occurred to configuration and/or address data relating to a VNF instance and stored in the memory.

Optionally, the change to the configuration and/or address data has been made by one of the VFN-SR and the VCS.

Optionally, the method further comprises the receiver receiving from the VCS an update comprising updated configuration and/or address data relating to one or more VNF instances; and the DBMS storing the updated configuration and/or address data in the memory.

According to a further aspect, there is provided a Virtual Configuration Server, VCS, for configuration and/or reconfiguration of Virtual Network Functions, VNF, instances in a telecommunications system. The VCS comprises a receiver configured to receive a notification from a Virtual Network Function Service Registry, VNF-SR, that a change has occurred in configuration and/or address data stored in a memory of the VNF-SR and relating to one or more VNF instances. The VCS comprises a configuration manager configured to determine a configuration instruction for one or more VNFs based on the received notification, and to control a transmitter to transmit the configuration instruction to the one or more VNF instances.

Optionally, the configuration manager is further configured to control the transmitter to transmit an update to the VNF-SR wherein the update comprises configuration and/or address data relating to the one or more VNFs and for storing in a memory of the VNF-SR.

According to a further aspect, there is provided a method for controlling a Virtual Configuration Server, VCS, for configuration and/or reconfiguration of Virtual Network Functions, VNF, instances in a telecommunications system. The method comprises receiving, by a receiver, a notification from a Virtual Network Function Service Registry, VNF-SR, that a change has occurred in configuration and/or address data stored in a memory of the VNF-SR and relating to one or more VNF instances. The method comprises determining, by a configuration manager, a configuration instruction for one or more VNF instances based on the received notification. The method comprises controlling, by the configuration manager, a transmitter to transmit the configuration instruction to the one or more VNF instances.

Optionally, the method further comprises the configuration manager controlling the transmitter to transmit an update to the VNF-SR, wherein the update comprises configuration and/or address data relating to the one or more VNFs and for storing in a memory of the VNF-SR.

According to a further aspect, there is provided a Virtual Network Function Manager, VNFM, for managing a plurality of Virtual Network Function, VNF, instances in a telecommunications system. The VNFM comprises an event subscriber configured to control a transmitter to transmit a subscription request to a Virtual Network Function Service Registry, VNF-SR, the subscription request comprising an identifier for a VNF. The VNFM comprises a receiver configured to receive a notification that one or more events has occurred in relation to the identified VNF.

According to a further aspect, there is provided a method for controlling a Virtual Network Function Manager, VNFM, for managing a plurality of Virtual Network Function, VNF, instances in a telecommunications system. The method comprises controlling, by an event subscriber, a transmitter to transmit a subscription request to a Virtual Network Function Service Registry, VNF-SR, the subscription request comprising an identifier for a VNF. The method comprises receiving, by a receiver, a notification that one or more events has occurred in relation to the identified VNF.

According to a further aspect, there is provided a computing device for hosting one or more Virtual Network Function, VNF, instances for undertaking the functionality of one or more nodes of a telecommunications system. Each VNF instance comprises a registration controller configured to control a transmitter to transmit a registration request to a VNF Service Registry, VNF-SR, the registration request identifying a public address of the VNF instance.

Optionally, the registration request comprises a classification for the VNF instance, and wherein each classification indicates a type of VNF address to be allocated to the VNF instance by the VNF-SR.

Optionally, the computing device further comprises an address retriever configured to control the transmitter to transmit to the VNF-SR a request for a VNF address of a further VNF instance for interworking therewith; and a receiver configured to receive the VNF address of the further VNF instance.

According to a further aspect, there is provided a method for controlling a computing device for hosting one or more Virtual Network Function, VNF, instances for undertaking the functionality of one or more nodes of a telecommunications system. The method comprises a registration controller controlling a transmitter to transmit a registration request to a VNF Service Registry, VNF-SR, the registration request identifying a public address of the VNF instance.

Optionally, the registration request comprises a classification for the VNF instance, and wherein each classification indicates a type of VNF address to be allocated to the VNF instance by the VNF-SR.

Optionally, the method further comprises an address retriever controlling the transmitter to transmit to the VNF-SR a request for a VNF address of a further VNF instance for interworking therewith; and a receiver configured to receive the VNF address of the further VNF instance.

According to further aspects, there is provided a computer program comprising instructions which, when executed on at least one processor, cause the at least one processor to carry out any method disclosed herein.

According to further aspects, there is provided a carrier containing a computer program discussed above, wherein the carrier is one of an electronic signal, optical signal, radio signal, or non-transitory computer readable storage medium.

BRIEF DESCRIPTION OF THE DRAWINGS

Exemplary embodiments of the invention are described herein with reference to the accompanying drawings, in which.

DETAILED DESCRIPTION

Figure 1:
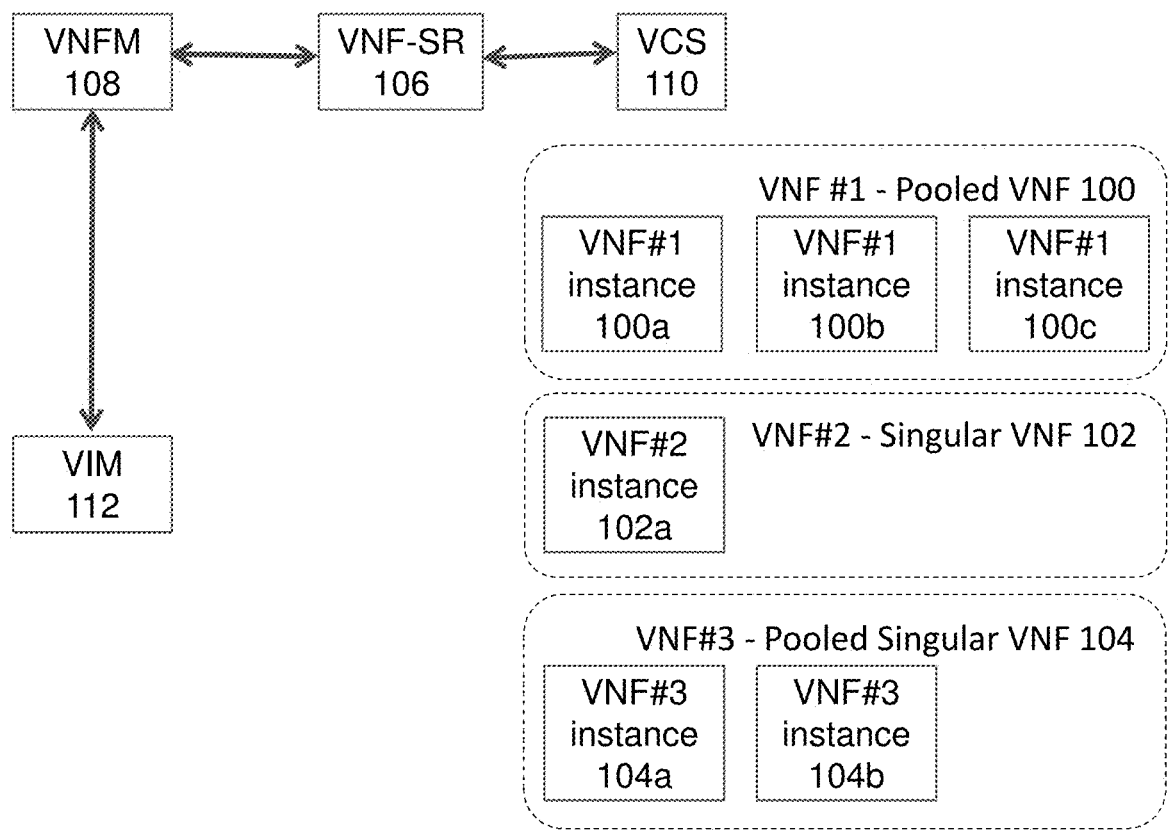
FIG. 1 is an architecture diagram showing the points of interconnection between a VNF Manager, VNF Configuration Server, VNF Service Registry and a number of VNF instances of different classes according to the classification in the Detailed Description.

FIG. 1 shows an architecture diagram of a system for NFV. The system comprises a plurality of VNFs: VNF#1 100, which is a pooled VNF; VNF#2 102, which is a singular VNF; and VNF#3 104, which is a pooled singular VNF. There are also instances of VNF#1 100a-c, VNF#2 102a and VNF#3 104a-b. The VNF instances may be in electrical communication with a VNF-SR 106 and optionally one or more of a VNFM 108, a VCS 110 and a Virtual Infrastructure Manager (VIM) 112, which is an entity responsible for lifecycle management of Virtual Machines, and may be used by the VNFM 108, which requests the creation and removal of VMs belonging to a VNF instance.

The VCS 110 is in electrical communication with the VNF-SR 106. The VNFM 108 is in electrical communication with the VNF-SR 106. Further, the VNFM 108 is in electrical communication with the VIM 112. The VNF instances 100-104, the VNF-SR 106, the VNFM 108, the VCS 110 and the VIM 112 operate as disclosed herein.

In principle three classes of VNF are considered herein.
1. Pooled VNFs: This class models VNFs whose instances are mostly stateless, so there is not a need for tight control on addressing of every instance individually. For VNFs of this class, the most efficient address management approach is having a pool of addresses shared by all the instances, and identifying each instance by means of an automatically assigned name, such that the VNF operator does not need to take care of names or addresses. VNFs interworking with a pooled VNF instance may pick any address from the pool in order to contact the VNF they require. One example of this class of VNFs is the Home Subscriber Server (HSS) Front-end (FE).
2. Singular VNFs: This class models VNFs constrained to a single instance. Usually this single instance is referenced by multiple VNF instances of other classes, so it is necessary to be able to identify it uniquely within the NFV network, and the VNF operator needs to take care that the Singular VNF's unique name is bound to a single pre-allocated address. VNFs interworking with a Singular VNF instance must use the single address of that instance in order to contact the VNF they require. One example of this class of VNFs is a Domain Name Server (DNS).
3. Singular pooled VNFs: This class models VNFs made of a—usually small—known number of instances. VNFs of this class have their instances deployed and removed altogether, and each instance is referenced by several VNFs of other classes. Hence the most efficient approach is a compromise between those of the pooled and singular VNF classes, having names and addresses automatically allocated from a name pool and an address pool to every instance so at any time it is easy to identify all the instances of the VNF. In this case the VNF operator needs to make sure that every VNF's unique name is bound to a single pre-allocated address. VNFs interworking with a Singular Pooled VNF must know which specific VNF instance within the pool they need to contact (e.g. 'CUDB1' or 'CUDB2') and use the corresponding address of that instance. One example of this class of VNFs is the Common User Database, CUDB.

Notice that a Singular VNF can be seen as a degenerate case of Singular Pooled VNF, where the pool is of size 1. However tagging a VNF specifically with the 'Singular' attribute enables some simplifications in the algorithms included in this invention, as will be seen below.

Figure 2:
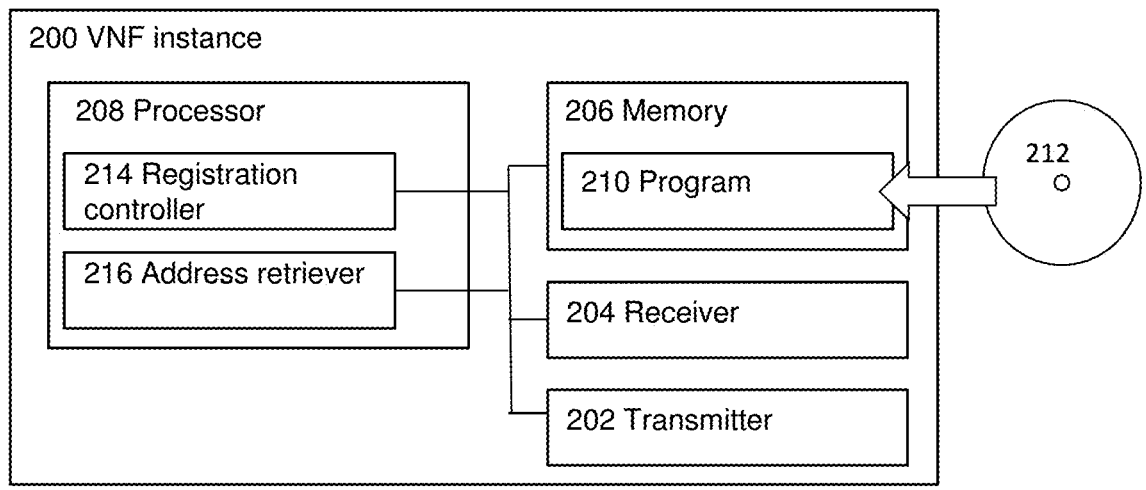
FIG. 2 is a block schematic diagram of a VNF instance.

FIG. 2 shows a schematic representation of a VNF instance 200, which may be any of the VNF instances 100a-c, 102a, 104a-b of FIG. 1. The VNF instance 200 comprises a transmitter 202 and a receiver 204. The transmitter 202 and receiver 204 may be in data communication with other network entities in a telecommunications network and are configured to transmit and receive data accordingly.

The VNF instance 200 further comprises a memory 206 and a processor 208. The memory 206 may comprise a non-volatile memory and/or a volatile memory. The memory 206 may have a computer program 210 stored therein. The computer program 210 may be configured to undertake the methods disclosed herein. The computer program 210 may be loaded in the memory 206 from a non-transitory computer readable medium 212, on which the computer program is stored. The processor 208 is configured to undertake one or more of the functions of a registration controller 214 and an address retriever 216, as set out below. Further, the memory 206 may be configured to store device data relating to one or more device identifiers and optionally comprising a device type and an IMS subscription type for each device identifier.

Each of the transmitter 202 and receiver 204, memory 206, processor 208, registration controller 214 and address retriever 216 is in data communication with the other features 202, 204, 206, 208, 210, 214, 216 of the VNF instance 200. The VNF instance 200 can be implemented as a combination of computer hardware and software. In particular, the registration controller 214 and address retriever 216 may be implemented as software configured to run on the processor 208. The memory 206 stores the various programs/executable files that are implemented by a processor 208, and also provides a storage unit for any required data. The programs/executable files stored in the memory 206, and implemented by the processor 208, can include the registration controller 214 and address retriever 216, but are not limited to such.

Figure 3:
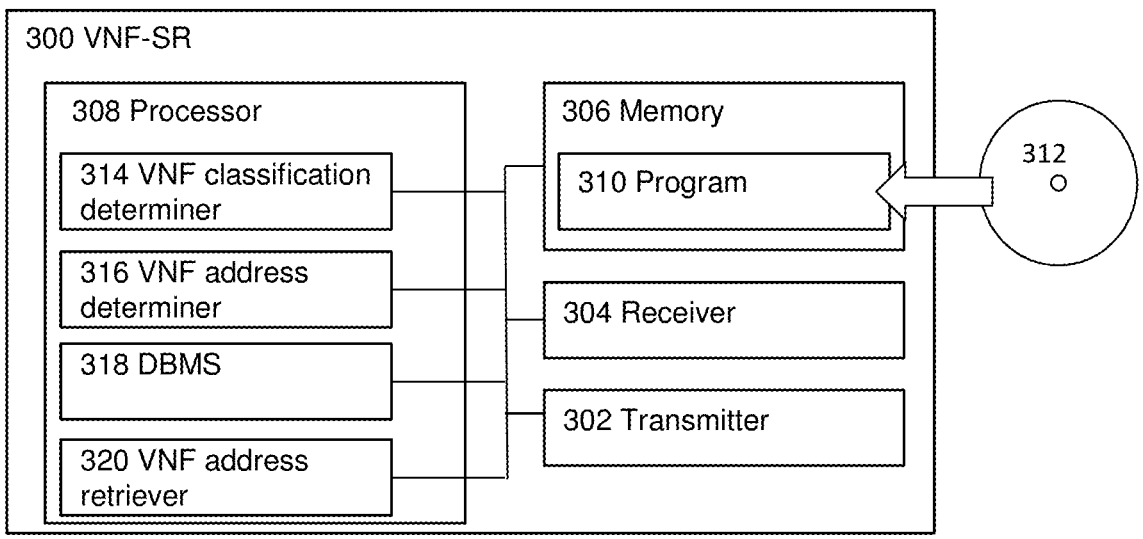
FIG. 3 is a block schematic diagram of a VNF Service Registry.

FIG. 3 shows a schematic representation of a VNF-SR 300, which may be a VNF-SR 106 of FIG. 1. The VNF-SR 300 comprises a transmitter 302 and a receiver 304. The transmitter 302 and receiver 304 may be in data communication with other network entities in a telecommunications network and are configured to transmit and receive data accordingly.

The VNF-SR 300 further comprises a memory 306 and a processor 308. The memory 306 may comprise a non-volatile memory and/or a volatile memory. The memory 306 may have a computer program 310 stored therein. The computer program 310 may be configured to undertake the methods disclosed herein. The computer program 310 may be loaded in the memory 306 from a non-transitory computer readable medium 312, on which the computer program is stored. The processor 308 is configured to undertake the function of a VNF classification determiner 314, a VNF address determiner 316, a database management system (DBMS) 318 and a VNF address retriever 320, as set out below.

Each of the transmitter 302 and receiver 304, memory 306, processor 308, VNF classification determiner 314, VNF address determiner 316, DBMS 318 and VNF address retriever 320 is in data communication with the other features 302, 304, 306, 308, 310, 314, 316, 318, 320 of the VNF-SR 300. The VNF-SR 300 can be implemented as a combination of computer hardware and software. In particular, the VNF classification determiner 314, VNF address determiner 316, DBMS 318 and VNF address retriever 320 may be implemented as software configured to run on the processor 308. The memory 306 stores the various programs/executable files that are implemented by a processor 308, and also provides a storage unit for any required data. The programs/executable files stored in the memory 306, and implemented by the processor 308, can include the VNF classification determiner 314, VNF address determiner 316, DBMS 318 and VNF address retriever 320, but are not limited to such.

Figure 4:
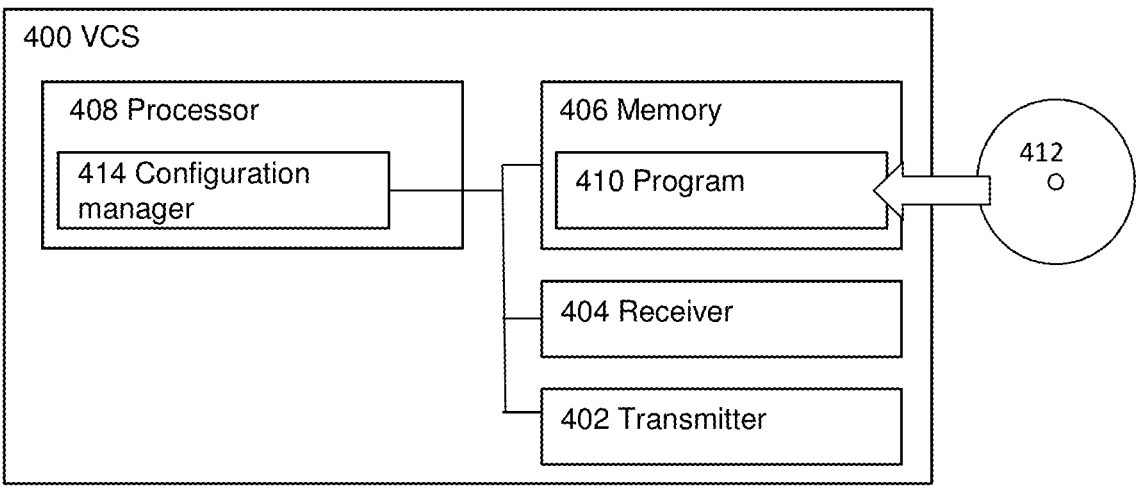
FIG. 4 is a block schematic diagram of a VNF Configuration Server.

FIG. 4 shows a schematic representation of a VNF Configuration Server (VCS) 400, which may be a VCS 110 of FIG. 1. The VCS 400 comprises a transmitter 402 and a receiver 404. The transmitter 402 and receiver 404 may be in data communication with other network entities in a telecommunications network and are configured to transmit and receive data accordingly.

The VCS 400 further comprises a memory 406 and a processor 408. The memory 406 may comprise a non-volatile memory and/or a volatile memory. The memory 406 may have a computer program 410 stored therein. The computer program 410 may be configured to undertake the methods disclosed herein. The computer program 410 may be loaded in the memory 406 from a non-transitory computer readable medium 412, on which the computer program is stored. The processor 408 is configured to undertake one or more of the functions of a configuration manager 414, as set out below.

Each of the transmitter 402 and receiver 404, memory 406, processor 408 and configuration manager 414 is in data communication with the other features 402, 404, 406, 408, 410, 414 of the VCS 400. The VCS 400 can be implemented as a combination of computer hardware and software. In particular, the configuration manager 414 may be implemented as software configured to run on the processor 408. The memory 406 stores the various programs/executable files that are implemented by a processor 408, and also provides a storage unit for any required data. The programs/executable files stored in the memory 406, and implemented by the processor 408, can include the configuration manager 414, but are not limited to such.

Figure 5:
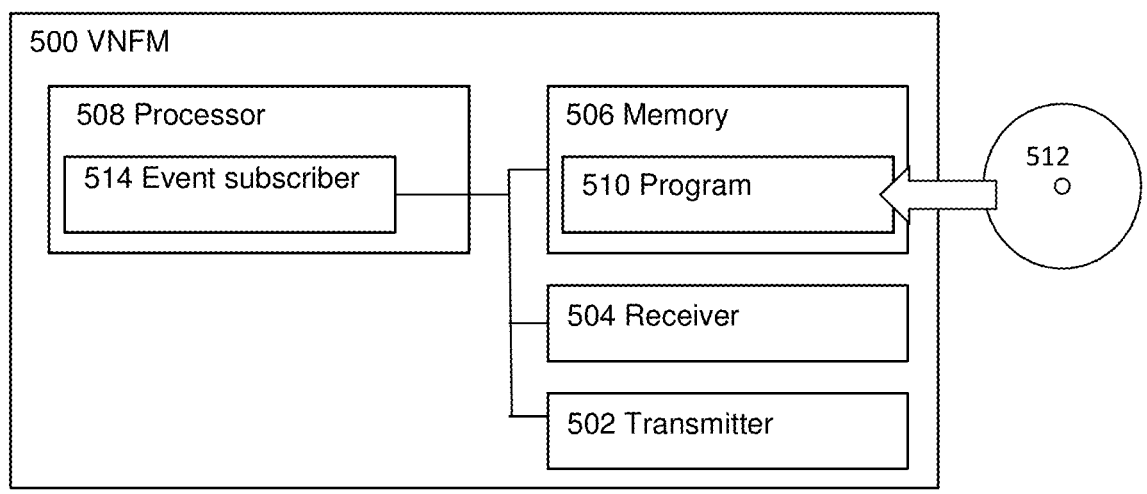
FIG. 5 is a block schematic diagram of a VNF Manager.
Figure 6:
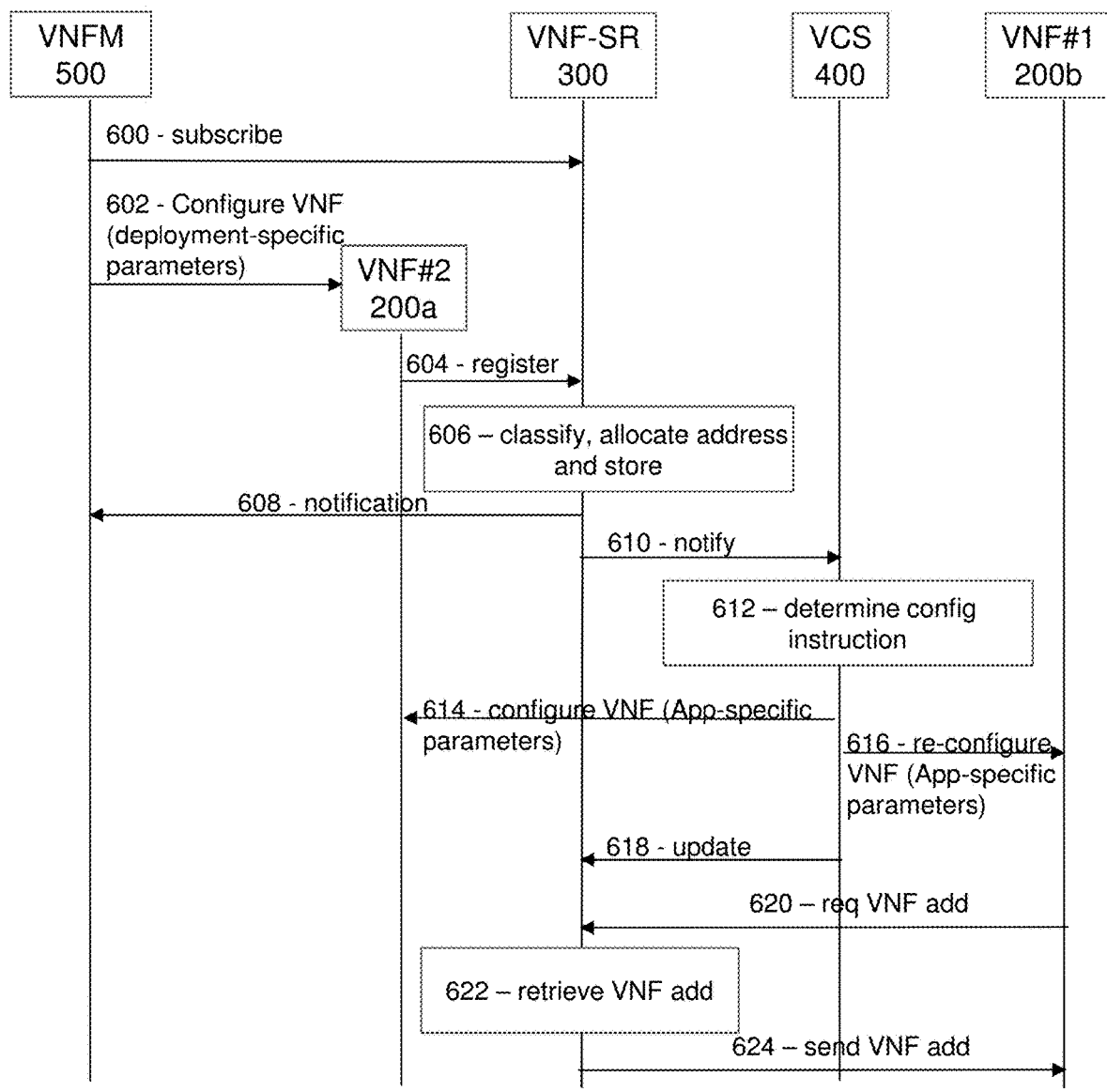
FIG. 6 is a signalling flow diagram showing a method for establishing one or more VNFs for use in telecommunications system.

FIG. 5 shows a schematic representation of a VNFM 500, which may be a VNFM 108 of FIG. 1. The VNFM 500 comprises a transmitter 502 and a receiver 504. The transmitter 502 and receiver 504 may be in data communication with other network entities in a telecommunications network and are configured to transmit and receive data accordingly.

The VNFM 500 further comprises a memory 506 and a processor 508. The memory 506 may comprise a non-volatile memory and/or a volatile memory. The memory 506 may have a computer program 510 stored therein. The computer program 510 may be configured to undertake the methods disclosed herein. The computer program 510 may be loaded in the memory 506 from a non-transitory computer readable medium 512, on which the computer program is stored. The processor 508 is configured to undertake one or more of the functions of an event subscriber 514, as set out below.

Each of the transmitter 502 and receiver 504, memory 506, processor 508 and event subscriber 514 is in data communication with the other features 502, 504, 506, 508, 510, 514 of the VNFM 500. The VNFM 500 can be implemented as a combination of computer hardware and software. In particular, the event subscriber 514 may be implemented as software configured to run on the processor 508. The memory 506 stores the various programs/executable files that are implemented by a processor 508, and also provides a storage unit for any required data. The programs/executable files stored in the memory 506, and implemented by the processor 508, can include the event subscriber 514, but are not limited to such.

The VNF DBMS 318 in the VNF-SR 300 may be pre-provisioned with the VNFs 200 it must handle. This pre-provisioning can be done e.g. by an NFV Orchestrator (NFVO) on loading a VNF catalogue. For every VNF 200 in the catalogue, one record may be created in a VNF pool table stored in the memory 306 by the VNF DBMS 318.

On start-up every VNF instance 200 send a registration request message to the VNF-SR. Depending on the VNF class the instance belongs to (this is known during VNF design-time and in most cases determined by the VNF architecture), the following information is included in the registration message:
1. Pooled VNFs: public address (VNF type (e.g. HSS-FE) may be included to tell apart VNFs in cases of overlapping address pools, when the public address included in the registration message belongs to two or more pools bound to different VNFs)
2. Singular VNFs: public address (VNF type (e.g. DNS) may be included but is not necessary since the public address uniquely identifies the VNF)
3. Pooled singular VNFs: public address (VNF type (e.g. CUDB) may be included but is not necessary since the public address uniquely identifies the VNF)

The VNF type in the registration requests may be absent or ignored. However in case of Pooled VNFs that requires careful definition of address pools in the VIM so that each VNF 200 receives address(es) from a specific pool. In that way, the VNF type may be identified by the pool that the public address included in the registration message belongs to.

When sending a registration request, a VNF instance 200 is unable to include its public IP address in the request since it is using a private, changing IP address (only the VIM knows the public IP address-private IP address association). Therefore, the VNF-SR 300 may determine the VNF instance's public address from the 'source address' field in the header of the data packet carrying the registration message.

For legacy VNFs 200 not adapted to a NFV-MANO (i.e.: Network Function Virtualization—MANagement and Orchestration) solution having a VNF-SR 300, the VNF Manager (VNFM) 500 itself can register the VNFs 200 it commands to be instantiated in the VNF-SR 300, using the information on VM addressing reported by the VIM after VNF instantiation.

The NFV operator can, using the VIM, define a single, elastic pool of addresses for all the pooled VNFs (e.g. HSS-FE, HLR-FE, UPG, AS etc.), single addresses for singular VNFs, and a single static pool of addresses for singular pooled VNFs. The VNF-SR enables identification of every VNF instance 200 regardless the actual address the VIM has allocated to the VMs when realizing the VNF instance 200. A query by VNF type or VNF name sent to the DBMS 318 of the VNF-SR 300 will return the VNF information stored in the memory 306 of the VNF-SR 300.

By contrast, in known methods the NFV operator has to plan carefully ahead naming and addressing for each and every VNF and VNF instance so that he or she is able to identify a VNF instance given its name or address.

To (re-)configure VNF instances in the NFV network, the NFV-MANO specifications recommend using VM image configuration mechanisms, which have been inherited from the Information Technology (IT) industry.

A problem with VM image configuration is that changing the configuration requires restarting of the VM. In telecommunications systems, this may be unacceptable, as the effects of restarting one or more VMs in a telecommunications system range from being barely noticeable in the case of a stateless VNF instance, to a potential service interruption in case of a critical VNF instance. Service interruptions in telecommunications systems cannot be tolerated.

Additionally, for certain complex VNFs the configuration by means of VM image-based mechanisms is not possible. Some configuration changes of such VNFs may require the VNF instance to be up and running throughout reconfiguration, since they involve collateral effects on other VNF instances that need to be carried out before the change can be considered done.

To support VNF configuration independently of VM images, methods and apparatus disclosed herein define a VCS functional block 400. The VCS 400 makes use of the VNF database inside the VNF-SR.

The VCS 400 comprises a configuration manager 414 configured to set PoolConfig and VNFConfig values for VNF pools and VNF instances in the memory 306 controlled by the DBMS 318 of the VNF-SR 300. The NFV operator may use the configuration manager 414 to store references to the configuration resources that define VNF and VNF instance configurations. The configuration manager 414 also controls performance of actions necessary to complete a configuration operation on a VNF or VNF instance.

Since VNFs may have specific procedures for certain configuration operations, a VCS 400 may comprise a plurality of configuration managers 414 that may be of different types and executing different logic.

In exemplary methods and apparatus, the configuration manager 414 monitors the DBMS 318 of the VNF-SR 300 for changes to the data stored in respect of one or more VNFs 200. On detecting a change in stored data, the configuration manager 414 may undertake the following steps:
1. Read the PoolConfig and/or VNFConfig (depending on the change detected) fields from the memory 306 of the VNF-SR 300 via the DBMS 318;
2. De-reference the values in the field(s) to obtain the configuration resources; and
3. Depending on the change detected, select one configuration operation and execute the logic corresponding to that operation using the configuration resource(s) as input to that logic.

In exemplary methods and apparatus, the configuration manager 414 will contain logic for execution corresponding to the operations "new VNF instance", "removed VNF instance", "VNF configuration change" and "VNF instance configuration change". VNF-specific configuration managers may contain logic corresponding to additional operations.

FIG. 5 is a signaling diagram for an exemplary method. FIG. 5 assumes that having a new VNF instance in the NF (VNF2) affects both the new VNF instance and another VNF instance (VNF1) in the same NF that interworks with VNF2.

The event subscriber 514 of the VNFM 500 controls the transmitter 502 to transmit 600 a subscription request to the VNF-SR 300. The subscription request comprises an identifier for a VNF. The subscription request may comprise: a VNF name uniquely identifying the VNF and/or a VIM identifier identifying the subscription. The VIM identifier may be the same as a VIM ID that may be received by the VNFM 500 from a NFVO in a message acknowledging (ACK) to a Grant Lifecycle Operation request.

The VNFM 500 then configures 602 a new VNF instance 200a (VNF2) in the normal way. The VNF instance is an instance of the VNF identified in the subscription request.

The registration controller 214 of VNF2 200a transmits 604 a registration request to the VNF-SR 300. The registration request may include a public identifier address for the VNF instance VNF2 200a and may optionally include a classification or type for VNF2 200a indicating a type of address to be allocated to that VNF instance. The classifications and associated types of address include pooled VNFs, singular VNFs and pooled singular VNFs, as discussed above.

Specifically, the registration message may comprise one or more of:
- A VNF IP address: this is the public IP address of the VNF instance, VNF2 200a, as seen from the MANO infrastructure (hence the VNF-SR 300). This address is unknown to VNF2 200a instance since the instance is aware of its own private IP address only. Therefore the VNF-SR 300 may obtain the public address from the header of the IP packet carrying the registration message;
- VNF type: this is an identifier identifying the classification of VNF VNF2 200a belongs to. The VNF class is known to VNF2 200a, since it is determined by the software (SW) running in the instance's VM(s). For VNF instances falling in the singular VNF category this value may be omitted since the VNF-SR 300 is able to determine the VNF type from its internal database;
- VNF name: this is an identifier unique to the VNF instance. The VNF instance may or may not be able to determine its own name. A case where the instance would be able to determine its name is when that name is built from values known to the instance, e.g. the host name of (one of) the VM(s) running the instance. If the VNF instance does not provide a name the VNF-SR 300 will assign one that will be stored in the memory 306 by the DBMS 318.

The receiver 304 of the VNF-SR 300 receives the registration request and the VNF address determiner 316 determines 606 a VNF address for VNF2 200a based on the received data in the registration request. The VNF classification determiner 314 may determine the classification of VNF2 200a based on the received registration request and the VNF address determiner 316 may determine the VNF address for VNF2 200a based on the determined classification.

The VNF determiner 316 may determine that the VNF address for VNF2 200a is one of an address from an elastic pool of addresses, an address uniquely identifying VNF2 and an address from a static pool of addresses, as discussed above.

The DBMS 318 then stores the determined VNF address for VNF2 in the memory 306.

In exemplary methods and apparatus, the VNF classification determiner 314 may determine the classification of VNF2 200a based on the public address included in the registration request. In some exemplary methods and apparatus, the VNF classification determiner 316 may determine the classification of VNF2 200a based on a classification identifier that may be included in the registration message.

The DBMS 318 may control the transmitter 302 of the VNF-SR to transmit 608 a notification to the VNFM 500 that an event has occurred in relation to a VNF to which the VNFM 500 subscribed in the subscription request at 600. In the case of FIG. 5, the notification identifies that a new instance of the VNF, VNF2 200a, has been configured. As set out above, other events might include the removal of a VNF instance of a VNF, a VNF configuration change and VNF instance configuration change.

The DBMS 318 also controls the transmitter 302 to transmit 610 a notification to the VCS 400. The notification indicates that a change has occurred to configuration and/or address data relating to VNF2 200a. The notification may be any of those mentioned above and in the case of FIG. 5 is a new VNF instance notification.

The configuration manager 414 determines 612 a set of configuration instructions (e.g. a sequence of NETCONF commands updating values in the VNF configuration) for one or more VNF instances based on the received notification and controls the transmitter 402 to transmit 614, 616 the configuration instruction to the VNFs. In the case of FIG. 5, an earlier instance of the VNF, VNF1 200b, is required to interwork with VNF2 200a. Therefore, the configuration instruction is sent to both VNF2 200a and VNF1 200b such that they are configured to communicate with each other.

The configuration manager 414 then controls the transmitter 402 to transmit 618 an update to the VNF-SR 300 so that the new configurations of VNF2 200a and VNF1 200b may be stored in the memory 306 by the DBMS 318. It is noted that the storing of the new configurations may, in itself, trigger an event that should be notified to one or both of the VNFM 500 and the VCS 400.

The address retriever 216 of VNF1 200b (or VNF2 200a) may control the transmitter 202 to transmit 620 a request for a VNF address of another VNF instance 200 (e.g. VNF2 200a) to the VNF-SR 300. VNF1 200b may require the VNF address of the other VNF instance in order to interwork with it, as discussed above.

The VNF address retriever 320 of the VNF-SR 300 retrieves 622 the VNF address of the other VNF instance from the memory 306 and controls the transmitter 302 to transmit 624 the retrieved VNF address to VNF1 200b. This can then be used by VNF1 200b to communicate with the other VNF instance as required.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. A Virtual Network Function Service Registry, VNF-SR, for allocating and storing Virtual Network Function, VNF, addresses and/or configurations for a plurality of VNF instances in a telecommunications system, the VNF-SR comprising:
   a receiver configured to receive a registration request from a computing device for hosting one or more of the plurality of VNF instances, the registration request comprising data identifying a public address of a VNF instance and data identifying a classification of the VNF instance, wherein the classification identifies a VNF type of the VNF instance;
   a processor; and
   a memory comprising executable instructions that when executed by the processor causes the processor to:
   determine a VNF address for the VNF instance based on the received registration request;
   store the determined VNF address in a memory;
   determine, based on the received registration request, the classification of the VNF instance as one of: a pooled VNF where the VNF address is one of a plurality of VNF addresses in an elastic pool of VNF addresses; a singular VNF where the VNF address is a single uniquely identifiable VNF address; and a singular pooled VNF where the VNF address is one of a plurality of VNF addresses in a static pool of VNF addresses;
   determine the VNF address based on the determined classification;
   receive from a first VNF instance a request for a VNF address of a second VNF instance; and
   retrieve from the memory the VNF address of the second VNF instance and to control a transmitter to transmit the retrieved VNF address to the first VNF instance.

2. The Virtual Network Function Service Registry, VNF-SR, according to claim 1, wherein the memory comprises executable instructions that when executed by the processor further causes the processor to determine the classification of the VNF instance based on the identified public address.

3. The Virtual Network Function Service Registry, VNF-SR, according to claim 1, wherein the memory comprises executable instructions that when executed by the processor further causes the processor to determine that the classification of the VNF instance is the identified classification.

4. The Virtual Network Function Service Registry, VNF-SR, according to claim 1, wherein the receiver is further configured to receive a subscription request from a VNF Manager, VNFM, the subscription request comprising an identifier for a VNF, and the VNF-SR further comprising
   a transmitter configured to transmit a notification to the VNFM when an event occurs in relation to the identified VNF.

5. The Virtual Network Function Service Registry, VNF-SR, according to claim 1, wherein the memory comprises executable instructions that when executed by the processor further causes the processor to control a transmitter of the VNF-SR to transmit a notification to a Virtual Configuration Server, VCS, when a change has occurred to configuration and/or address data relating to a VNF instance and stored in the memory.

6. The Virtual Network Function Service Registry, VNF-SR, according to claim 5, wherein the change to the configuration and/or address data has been made by one of the VFN-SR and the VCS.

7. The Virtual Network Function Service Registry, VNF-SR, according to claim 5, wherein the receiver is configured to receive from the VCS an update comprising updated configuration and/or address data relating to one or more VNF instances, and wherein the memory comprises executable instructions that when executed by the processor further causes the processor to store the updated configuration and/or address data in the memory.

8. A method for controlling a Virtual Network Function Service Registry, VNF-SR, for allocating and storing Virtual Network Function, VNF, addresses for a plurality of VNF instances in a telecommunications system, the method comprising:

receiving, by a receiver of the VNF-SR, a registration request from a computing device for hosting one or more of the plurality of VNF instances, the registration request comprising data identifying a public address of a VNF instance and data identifying a classification of the VNF instance, wherein the classification identifies a VNF type of the VNF instance;

determining a VNF address for the VNF instance based on the received registration request;

storing the determined VNF address in a memory;

determining, based on the received registration request, a classification of the VNF instance as one of: a pooled VNF where the VNF address is one of a plurality of VNF addresses in an elastic pool of VNF addresses; a singular VNF where the VNF address is a single uniquely identifiable VNF address; and a singular pooled VNF where the VNF address is one of a plurality of VNF addresses in a static pool of VNF addresses;

determining the VNF address based on the determined classification;

receiving from a first VNF instance a request for a VNF address of a second VNF instance;

retrieving from the memory the VNF address of the second VNF instance; and transmitting, by a transmitter of the VNF-SR, the retrieved VNF address to the first VNF instance.

9. The method according to claim 8, wherein determining the classification comprises determining the classification of the VNF instance based on the identified public address.

10. The method according to claim 8, wherein determining the classification comprises determining that the classification of the VNF instance is the identified classification.

11. The method according to claim 8, further comprising receiving, by the receiver, a subscription request from a VNF Manager, VNFM, the subscription request comprising an identifier for a VNF; and transmitting, by a transmitter of the VNF-SR, a notification to the VNFM when an event occurs in relation to the identified VNF instance.

12. The method according to claim 8, further comprising controlling a transmitter of the VNF-SR to transmit a notification to a Virtual Configuration Server, VCS, when a change has occurred to configuration and/or address data relating to a VNF instance and stored in the memory.

13. The method according to claim 12, wherein the change to the configuration and/or address data has been made by one of the VFN-SR and the VCS.

14. The method according to claim 12, further comprising receiving, by the receiver from the VCS an update comprising updated configuration and/or address data relating to one or more VNF instances; and storing the updated configuration and/or address data in the memory.

* * * * *